March 30, 1943.    F. R. HENSEL ET AL    2,314,882
COMPOSITE METAL STRUCTURE
Filed Oct. 15, 1940
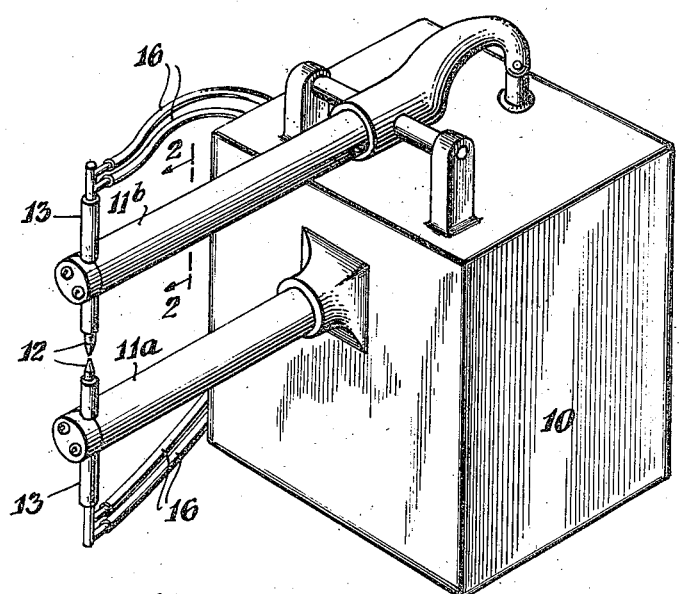
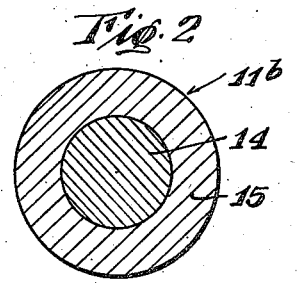
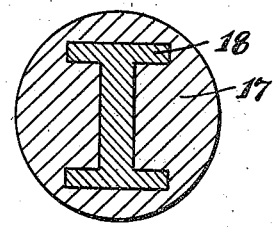
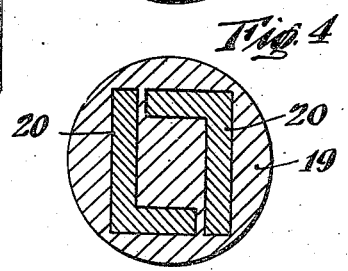
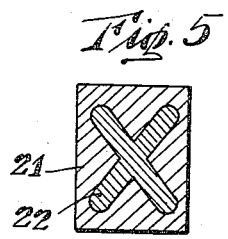
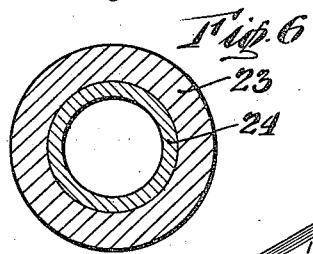
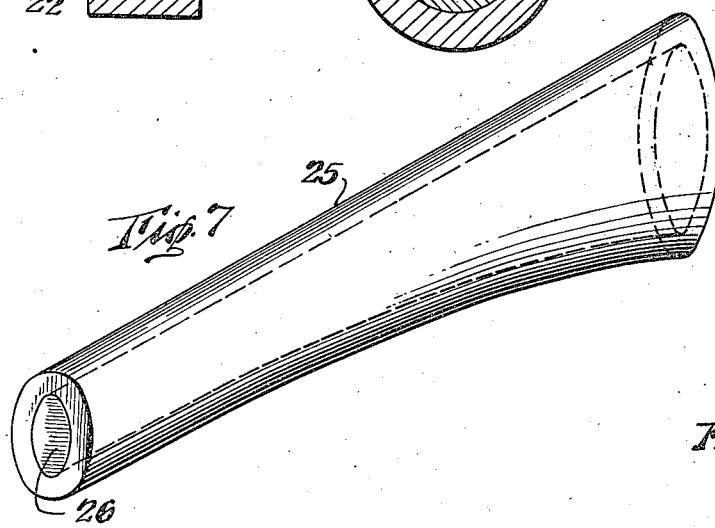
INVENTORS
Franz R. Hensel
BY Earl I. Larsen
ATTORNEY Patented Mar. 30, 1943

2,314,882

UNITED STATES PATENT OFFICE 2,314,882

COMPOSITE METAL STRUCTURE

Franz R. Hensel and Earl I. Larsen, Indianapolis, Ind., assignors to P. R. Mallory & Co., Inc., Indianapolis, Ind., a corporation of Delaware Application October 15, 1940, Serial No. 361,236

2 Claims. (Cl. 219—4)

The present invention relates to composite metal structures.

It is an object of the present invention to provide structural members combining high rigidity with high thermal and electrical conductivity.

It is a further object of the present invention to provide electric current conducting members having a ferrous metal core of high elastic properties and a surface of a heat treatable copper base alloy, said copper base alloy combining high thermal and electrical conductivity with hardness and strength.

Other objects of the invention will be apparent from the following description and accompanying drawing taken in connection with the appended claims.

The invention comprises the features of construction, combination of elements, arrangement of parts, and methods of manufacture and operation referred to above or which will be brought out and exemplified in the disclosure hereinafter set forth, including the illustrations in the drawing.

In the drawing:

Figure 1 is a perspective view of a resistance welding machine having parts embodying features of the invention;

Figure 2 is a section on the line 2—2 of Figure 1;

Figures 3 to 6 represent cross sections of members of modified construction; and Figure 7 is a perspective view of a tapered arm.

According to the present invention, materials having two different moduli of elasticity are combined into one solid structure as by casting a ferrous member into a heat treatable copper base material, the two parts being of such compositions that they will respond to the same or a very similar heat treatment. It is thus possible to produce a heat treated composite structure having a desirable combination of high strength with high electrical and heat conductivity which cannot be attained with either material used alone.

Copper alloys are characterized by a comparatively low modulus of elasticity, the modulus varying from 16 to 18 million, while the modulus of steel or ferrous members is in the neighborhood of 30 million. In resistance welding machines, arms are used which are supported at one end and which are subjected to a load at the free end. Such arms, for proper operation of the machine, should be of the highest rigidity obtainable, but are also required to offer extremely low resistance to electric current flow and to be of good heat conductivity to prevent deleterious localization of heat in the arms during use.

Assuming a load of 600 lbs. at a distance of 24", a 2½" diameter copper bar will show a maximum deflection of .085". Under the same conditions of load, a similar piece of steel will show a maximum deflection of .0482". The area of a 2½" diameter shaft is 4.9087 square inches.

The deflection can be reduced by using steel members of special sections. The maximum deflection is indirectly proportional to the moment of inertia. By taking a tubular section of steel with an outside diameter of 2½" and an inside diameter of 2", an area is obtained of 1.767 square inches. The maximum deflection with a 600 lb. load at a distance of 24" from the support, is .0784". Taking a solid bar of the same area, the maximum deflection would be .371", 4 or 5 times as high as the tubular section. High moments of inertia are also obtained in T sections, I sections, U, channel or triangular sections.

The heat treatable copper alloys which are contemplated by the present invention, comprise copper alloys containing age hardening ingredients, such as chromium, beryllium, silicides, such as the silicides of iron group metals, manganese and chromium, beryllides, phosphides, aluminides and other intermetallic compounds of such metals.

A few specific examples of the alloys under consideration are given below:

|  | Per cent |
|---|---|
| (A) Chromium | 6 |
| Copper | Balance |

(Instead of pure chromium, chromium silicide, chromium beryllide, chromium-lithium, or other ternary and quaternary alloys may be used.)

|  | Per cent |
|---|---|
| (B) Nickel and/or cobalt | 2.4 |
| Silicon | .6 |
| Copper | Balance |

(Instead of straight nickel silicide alloys, other additions may be made, such as beryllium, zirconium, zinc and the like.)

|  | Per cent |
|---|---|
| (C) Cobalt | .5 to 3 |
| Beryllium | .30 to 40 |
| Copper | Balance |

(In this group of alloys it may be possible to add silicon, iron or similar metals.)

|  | Per cent |
|---|---|
| (D) Beryllium | 1.5 to 2.5 |
| Copper | Balance |

(In this class of alloy also, other metal such as cobalt, nickel, silicon or chromium, may be added.)

The above copper alloys are all improved by heat treatment consisting in a quenching and subsequent ageing operation. Both the quenching temperature and ageing temperatures depend upon the compositions of the respective alloys.

When selecting a steel insert, we prefer to match the heat treating temperatures of the steel with those of the copper alloy. For instance, if a copper-chromium casting with a steel insert of high rigidity is made, a chromium steel containing 4 to 6% chromium and over .10% carbon, is very suitable as an insert, because this type of steel has to be quenched from 1800 deg. F., which is also the quenching temperature of a copper-chromium alloy containing approximately .5 to 1% chromium. The aging temperature of certain copper-chromium alloys varies from 800 to 950 deg. F., which temperatures are also suitable for tempering this type of steel. The tensile properties of the steel after heat treating will be quite high, with a yield point of over 150,000 p. s. i., a tensile strength of 180,000 p. s. i. and a Brinell hardness of over 300. The modulus of the copper-chromium casting may be 17 million, while the modulus of the chromium steel may be 30 million. This type of steel is also suitable as inserts for copper alloys which are hardened by means of intermetallic compounds, such as cobalt beryllides, because the latter are also quenched from a temperature range of 1700 to 1800 deg. F. Some of the heat treatable copper alloys, such as copper-2.25% beryllium alloy, and the nickel silicide alloys, are quenched from considerably lower temperatures. The selection of suitable steel inserts for such materials is considerably larger and plain carbon steels or chromium-vanadium steels, manganese-molybdenum steels, may be selected for inserts. The resulting physical properties of the steel inserts may vary over a considerable range, but it is the object of the present invention to provide steel inserts having a high yield point and a high tensile strength, together with reasonable amounts of elongation and reduction in area. The yield point of the inserts after complete heat treatment should exceed 70,000 p. s. i., while the tensile strength should exceed 100,000 p. s. i.

Applications of the present invention are quite numerous in the construction of electrical equipment, such as switch gear apparatus, electrical resistance welding machines, overhead structures and the like.

For many applications the use of a magnetic insert material is not desirable. In such cases, the present invention contemplates an insert of a ferrous material of austenitic nature. These austenitic steels have a considerably lower tensile strength and also a lower yield point. The yield point ranges from 35 to 60,000 p. s. i. and the tensile strength ranges from 80,000 to 110,000 p. s. i. These austenitic steels contain as the main alloying ingredients, nickel and chromium.

The following table gives certain nickel and chromium percentages, which are widely used for this class of steel:

|  | Per cent |
|---|---|
| (A) Chromium | 18 |
| Nickel | 8 |
| (B) Chromium | 18 |
| Nickel | 12 |
| (C) Chromium | 24 |
| Nickel | 12 |
| (D) Chromium | 26 |
| Nickel | 20 |

Other ingredients may be added such as columbium, titanium, molybdenum, selenium, silicon and ingredients which are more or less regularly present in steels such as carbon, manganese and phosphorus.

Other age-hardenable austenitic steels which are suitable are:

|  | Per cent |
|---|---|
| (A) Manganese | 10 |
| Nickel | 15 |
| Titanium | 4 |
| Iron | Balance |
| (B) Manganese | 10 |
| Nickel | 15 |
| Molybdenum | 15 |
| Iron | Balance |

Further age-hardening elements for austenitic steels may be beryllium or beryllium and titanium combined, or larger percentages of tungsten.

The preferred age-hardening process for the steel is quenching from above 1650 deg. F. and aging at a lower temperature.

The selection of the special steel section will depend on the type of castings to be made. Very often this section may be fabricated from strip material. The parts with cast inserts are made by regular foundry practice, such as molding in green sand or core sand or in chills, melting the copper alloy and pouring same into the mold, containing the ferrous member insert.

After the casting has been made, it is subjected to a heat treating cycle which improves the physical properties, both of the heat treatable copper alloy and the steel inserts. The cycle may consist, for example, of quenching the composite structure from the preferred quenching temperature for the materials used and then aging at a lower temperature.

Referring to the drawing Figure 1 shows a welding machine comprising a supporting frame or base 10 from which projects a welding electrode support arm 11a and from which is supported a movable welding electrode support arm 11b relatively movable toward and away from arm 11a by means within the base 11 and receiving high amperage welding current from a source (not shown) within the frame. A pair of cooperating welding electrodes 12 are supported in water-cooled holders 13 which are clamped on the ends of arms 11a and 11b. Water supply and waste tubes 16 supply circulating water.

Support arms 11a and 11b, according to the present invention comprise core portions 14 of heat treated steel and a surrounding surface portion 15 of a copper alloy similarly heat treated. The cross section of arm 11b is shown in Figure 2. Alternatively the core may be copper alloy and the outside steel although this combination is more difficult to manufacture.

Figure 3 represents a section of modified construction the steel reinforcement 18 having an I section within the integrally bonded surface portion 17 of copper alloy.

Figure 4 illustrates the use of L-shaped steel sections 20 within copper alloy arm 19.

In Figure 5 the copper alloy outside 21 has a square form and is reinforced with an X-shaped steel member 22.

Figure 6 represents the use of steel tubing 24 covered with a tubular layer of copper alloy 23.

In Figure 7 is shown a tapered copper alloy arm 25 having a correspondingly tapered steel insert 26 embodied therein.

In each of the above modifications the relative locations of the steel and copper may be reversed.

While the present invention as to its objects and advantages has been described herein as carried out in specific embodiments thereof, it is not desired to be limited thereby, but it is intended to cover the invention broadly, within the spirit and scope of the appended claims.

What is claimed is:

1. An electric current carrying arm consisting of a heat treatable austenitic steel insert and a heat treatable copper base alloy sheath cast around said insert, said steel containing age-hardening ingredients selected from the group consisting of nickel, chromium, manganese, titanium, molybdenum, tungsten and beryllium, said copper base alloy containing age-hardening ingredients selected from the group consisting of chromium, beryllium and silicides, beryllides, aluminides, phosphides of iron, cobalt, nickel, manganese and chromium, both said steel insert and said copper alloy sheath being improved in strength and said copper alloy being improved in electrical conductivity by the same heat treatment consisting of quenching from above 1650° F. and subsequently aging at below 1650° F.

2. An electric current carrying arm for a welding machine consisting of a heat treatable non-magnetic steel core and a heat treatable copper base alloy sheath cast around said core, said steel containing age-hardening ingredients selected from the group consisting of nickel, chromium, manganese, titanium, molybdenum, tungsten and beryllium, said copper base alloy containing age-hardening ingredients selected from the group consisting of chromium, beryllium and silicides, beryllides, aluminides, phosphides of iron, cobalt, nickel, manganese and chromium, both said steel insert and said copper alloy sheath being improved in strength and said copper alloy being improved in electrical conductivity by the same heat treatment consisting of quenching from above 1650° F. and subsequently aging at below 1650° F.

FRANZ R. HENSEL.
EARL I. LARSEN.